United States Patent

[11] 3,585,871

[72] Inventor Richard E. Alsch
 Lannon, Wis.
[21] Appl. No. 871,836
[22] Filed Oct. 28, 1969
[45] Patented June 22, 1971
[73] Assignee Graham Transmissions, Inc.
 Menomonee Falls, Wis.

[54] VARIABLE TRANSMISSION
 8 Claims, 2 Drawing Figs.
[52] U.S. Cl................................................. 74/198
[51] Int. Cl............................................F16h 15/26,
 F16h 15/08
[50] Field of Search............................................74/198, 200

[56] References Cited
 UNITED STATES PATENTS
 2,607,545 8/1952 McNabb........................ 74/200 X
 3,367,198 2/1968 Schottler....................... 74/198

Primary Examiner—Leonard H. Gerin
Attorneys—John W. Michael, Gerrit D. Foster, Bayard H. Michael, Paul R. Puerner, Joseph A. Gemignani, Andrew O. Riteris, Daniel VanDyke and Spencer B. Michael ABSTRACT: A variable transmission of the type having input and output discs connected by a rotatable ball galaxy has a dual system sharing the axial thrust load maintaining the input and output discs in motion transmitting engagement with the balls. A first pair of ball bearings are disposed one on each of the shafts connected to the discs and abut shoulders on the shafts to thereby limit bearing movement toward the discs and ball galaxy. Springs urge each of these first pair of ball bearings toward the discs and ball galaxy thereby providing an axial force maintaining motion transmitting engagement. A second pair of ball bearings are disposed axially outboard, relative to the discs and ball galaxy, of the first pair of bearings. The second bearings are also disposed one on each of the shafts and abut shaft shoulders limiting bearing movement toward the discs and balls. A spring engages one of the bearings of this second set and reacts through the other bearing to provide an additional axial force maintaining motion transmitting engagement. The bearings of the first pair have a slip fit on their respective shafts and the axial force transmitted through said second bearings bypasses the first bearings.

PATENTED JUN 22 1971

3,585,871

Inventor
Richard E. Alsch
By
Joseph A. Genovese
Attorney

VARIABLE TRANSMISSION

BACKGROUND OF INVENTION

This invention relates to variable transmissions and, more particularly, to such transmissions as utilize a ball galaxy to transmit motion between input and output shafts and an improved arrangement for providing the axial load on said ball galaxy necessary to transmit motion.

Variable transmissions of the type to which this invention most closely relates are disclosed in U.S. Rouverol Pat. No. 2,951,384 and R. E. Alsch Pat. No. 3,424,018. The type of transmission disclosed in the above mentioned patents utilizes a ball galaxy to transmit rotary motion between input and output discs which are supported for rotation about relatively offset axes. The driving connection between the discs is made through a ball galaxy, the ball galaxy being movable relative to the disc faces and the speed of the output disc being determined by the position of the ball galaxy relative to those faces. Generally provision must be made for axially loading the discs and ball galaxy to maintain driving engagement therebetween.

SUMMARY OF INVENTION

This invention is concerned with the problem of providing the aforementioned axial load and has as one of its general objects the provision of an improved arrangement for achieving axial loading.

For the achievement of this and other objects, this invention proposes an arrangement for applying an axial force urging input and output transmission members into driving engagement with a motion transmitting ball galaxy. A first spring is supported on one of the input or output shafts for the transmission and is disposed on one axial side of the transmission members and ball galaxy and reacts against a seat defined on the opposite axial side thereof. With this arrangement an axial force is provided urging the transmission members into engagement with the ball galaxy. A second spring is also supported on one of the input or output shafts and is disposed on one axial side of the transmission members and ball galaxy while reacting against a seat defined on the opposite axial side. This later arrangement also provides an axial force urging the transmission members into engagement with the ball galaxy. The second spring and the seat against which it reacts are located axially outboard, relative to the input and output members and ball galaxy, of the first spring and the seat against which it reacts. The first spring and the seat against which it reacts have a free or slip type fit with the shaft on which they are mounted so that the axial force provided by the second spring and its reaction seat bypasses the first spring and its reaction seat.

DESCRIPTION OF PREFERRED EMBODIMENT

Figure 1:
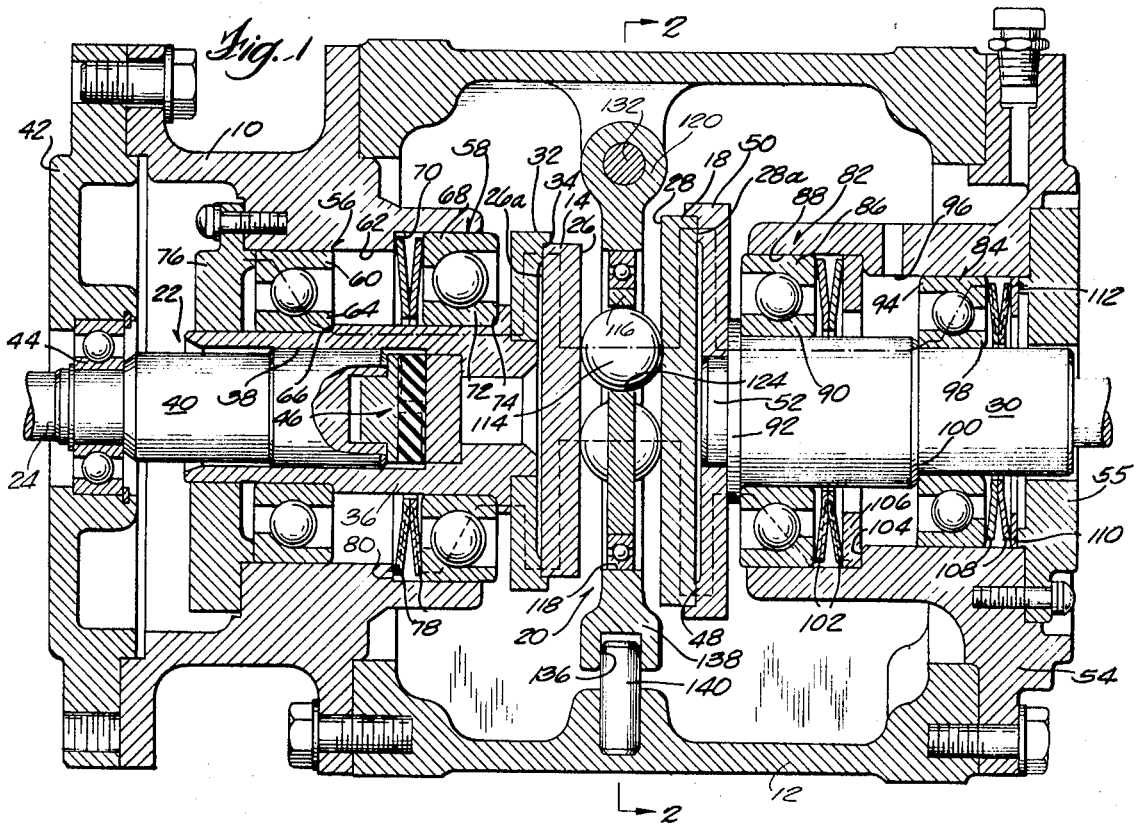
FIG. 1 is an axial section through a variable transmission embodying this invention.

With particular reference to the drawing, the variable transmission includes an outer housing made up of sections 10 and 12 and input and output discs 14 and 18 arranged within the housing. Ball galaxy 20 is also disposed within the housing and is frictionally held between the input and output discs. Input disc 14 is driven through an input shaft arrangement 22 by a suitable input power source. As illustrated in the drawings, the variable transmission is adapted to be driven from a nonmotorized source, such as a pulley wheel which would be keyed to the end 24 of the shaft arrangement so that the transmission would be powered from a belt drive.

Rotation of disc 14 is transmitted through the ball galaxy to output disc 18. In very general terms, discs 14 and 18 are supported for rotation about offset axes and the transmission of rotation between the discs is determined by the relative position of the ball galaxy with respect to the confronting planar surfaces 26 and 28 of the discs. Movement of the ball galaxy across the confronting faces of the discs permits adjustment in the torque transmission between the input and output discs. The output disc is connected to an output shaft 30.

With reference to the input side of the transmission, structurally input disc 14 is in the form of a circular disc having opposite planar surfaces 26 and 26a. Preferably, both surfaces 26 and 26a of the input disc are lapped so that the disc is convertible and either surface can be used as the ball engaging surface. As illustrated, disc surface 26a has a direct frictional engagement with a steel retaining ring 32. The friction between 26a and inner shoulder 34 of the steel retaining ring is the only driving connection to disc 14 other than the balls of the ball galaxy. Retaining ring 32 is fixed to one end of quill 36. The quill has an interior bore 38, which receives shaft 40. Shaft 40 is part of an assembly including end cover 42 and bearing 44 which is bolted to housing segment 10 when the transmission is to be used in connection with a nonmotorized power source such as a belt drive. A flexible coupling 46 establishes a driving connection between shaft 40 and quill 36. This flexible coupling is more completely described in a copending application of Richard E. Alsch, filed Oct. 29, 1969, Ser. No. 872,043 and entitled "Flexible Coupling" and assigned to the same assignee as this application. The details of the flexible coupling will not be described in this application and reliance is placed on this copending application for a more complete description of the coupling should such description become necessary. For the purposes of understanding this invention, it is sufficient to point out that the flexible coupling includes rigid members fixed to both the inner end of shaft 40 and the inner end of bore 38. A flexible member establishes the driving connection between these members. For better bearing loads, the inner end of shaft 40 has a slip fit in bore 38.

On the output side of the transmission, output disc 18 also has a pair of opposite planar surfaces 28 and 28a. Both surfaces 28 and 28a are lapped so that output disc 18 is also convertible. As illustrated, surface 28a engages shoulder 48 of retaining ring 50. Retaining ring 50 is fixed to end 52 of shaft 30 and shaft 30 extends through cover 54 and end plate 55 for engagement with any suitable output mechanism such as a speed reducer (now shown).

Bearings 56 and 58 support the input shaft. More particularly, bearing 56 has its outer race 60 engaged in bore 62 and its inner race 64 disposed on quill 36. Inner race 64 abuts quill shoulder 66 which faces in an axial direction away from the disc and galaxy assembly. Similarly, outer race 68 of bearing 58 is engaged in bore 70 and its inner race 72 is engaged on quill 36. Inner race 72 abuts shoulder 74 on the quill, this shoulder also faces axially and away from the disc and galaxy assembly. Bearing 56 is seated against cap 76 whereas bearing 58 presses against pair of generally annular springs 78 which in turn are seated against a shoulder 80. Springs 78 are generally of the type known as Belleville springs. Shoulders 66 and 74 establish a rigid connection between the bearing and the quill and, moreover, limit axial movement of the bearing on the quill toward the galaxy and ball assembly.

With reference to the output side of the transmission, output shaft 30 is supported by bearings 82 and 84. Again these bearings are conventional ball bearings. The outer race 86 of bearing 82 is engaged in bore 88 and the inner race 90 is disposed on shaft 30 in engagement with shoulder 92 on the output shaft. Bearing 84 has its outer race 94 engaged in bore 96 and its inner race 98 disposed on the output shaft. Inner race 98 abuts shoulder 100 of the output shaft. Springs 102, again Belleville-type springs, are disposed between bearing 82 and shoulder 104. Washer 106 is disposed between the springs and the shoulder for a purpose which will be described more completely hereinafter. Similarily, Belleville-type springs 108 are arranged between bearing 84 and washer 110 which engages shoulder 112.

Structurally, inner races 72 and 90 of bearings 58 and 82 have a slip fit on their respective shafts, specifically on quill 36 and output shaft 30. It will also be noted that the Belleville springs engage the outer races of the ball bearings and it is through the outer races that the spring forces are transmitted to the bearings.

With the structural arrangement just described it will be seen that a rigid connection is provided through the output shaft and the quill between the springs so that an axial force generated by the springs is transmitted through the shafts to urge the input and output discs toward engagement and maintains driving engagement of those discs with the ball galaxy.

In assembly, springs 78 and bearing 58 are arranged in bore 70 as illustrated. Quill 36 with retaining ring 32 is positioned in the housing. The ball galaxy is properly positioned and output shaft 30 with retaining ring 50 and output disc 18 are assembled into the housing with the output disc engaging the balls of the galaxy. Bearing 82 is positioned in abutment with shoulder 92 and Belleville springs 102 are also positioned on the output shaft. Washer 106 or some other suitable member, is positioned and a force gauge is engaged with that washer and a sufficient force is applied through the washer to compress springs 78 and 102 sufficiently to provide a portion of the axial force necessary to maintain the proper driving engagement between the disc and balls. For example, the force may be such as to provide two-thirds of the necessary axial force or thrust. A washer 106 with the necessary thickness to maintain the axial force, or a suitable number of shims if necessary, are then assembled behind the washer and cover 54 is connected to housing portion 12 so that shoulder 104 maintains the proper positioning of the washer, and shims, and the preset axial force is held.

At this point in the assembly of the transmission, bearing 56 is assembled onto quill 36 in engagement with quill shoulder 66. Cap 76 is bolted into place to securely clamp bearing 56 between the cap and shoulder 66. On the output side of the transmission, bearing 84 is positioned on shaft 30 in engagement with shoulder 100 and Belleville springs 108 and washer 110 are assembled into place. A gauge is engaged with washer 110 and sufficient force is applied through Belleville springs 108 to supply the remaining portion of the desired axial force. In this specific instance, the remaining one-third of the axial force is generated. Washer 110 of suitable thickness, or again a suitable number of shims, is positioned to hold the Belleville springs properly compressed and end plate 52 is clamped into position to hold the desired setting.

The inner set of Belleville springs 78 and 102 react against each other to provide their portion of the axial force and Belleville spring 108 reacts against a seat on the opposite axial side of the disc and galaxy assembly to provide the remaining portion of the axial force. With bearings 58 and 82 having a slip fit on quill 36 and shaft 30, respectively, the portion of the axial force supplied by the Belleville spring 108 bypasses the inner axial force system so that, although the two systems share the axial load, each functions virtually independently of the other.

The transmission of the axial thrust forces can be traced through the assembly much like an electric circuit. More specifically, from washer 106, which will be taken as the starting point for the axial force producing arrangement for the inner set of springs, the force proceeds in the manner of the dotted line in FIG. 1. More specifically, from washer 106 through the right Belleville spring 102 to the left Belleville spring 102, to outer race 86 through the balls of the ball bearing to inner race 90. From inner race 90 through shoulder 92 and through retaining ring 50 and output disc 18 to the ball galaxy. The force proceeds through the ball galaxy to input disc 14, retainer 32, inner race 72, the balls of bearing 58 to outer race 68 and through the Belleville springs to shoulder 80.

In the other system and beginning at washer 110, the force proceeds as illustrated by the phantom line from the washer through Belleville spring 108 to outer race 94, from the outer race 94 through the balls of bearing 84 to the inner race and through shoulder 100 and output shaft 30 to retainer ring 50 and output disc 18. Since bearing 90 has a slip fit on the output shaft, the force from Belleville springs 108 completely bypasses that bearing and its associated springs. The force proceeds from output disc 18 through the ball galaxy and through input disc 18, retainer ring 32, quill 36, shoulder 66, inner ring 64, balls of ball bearing 56, and outer race 60 to cap 76. Again since bearing 58 has a slip fit on the quill, this force transmission completely bypasses that bearing and its associated springs.

Thus the necessary axial thrust load is divided between two bearing and spring systems and this reduces the load on each individual bearing so that smaller bearings can be utilized. Moreover, this provides a more versatile and more efficient thrust arrangement and one which can be more precisely adjusted.

Figure 2:
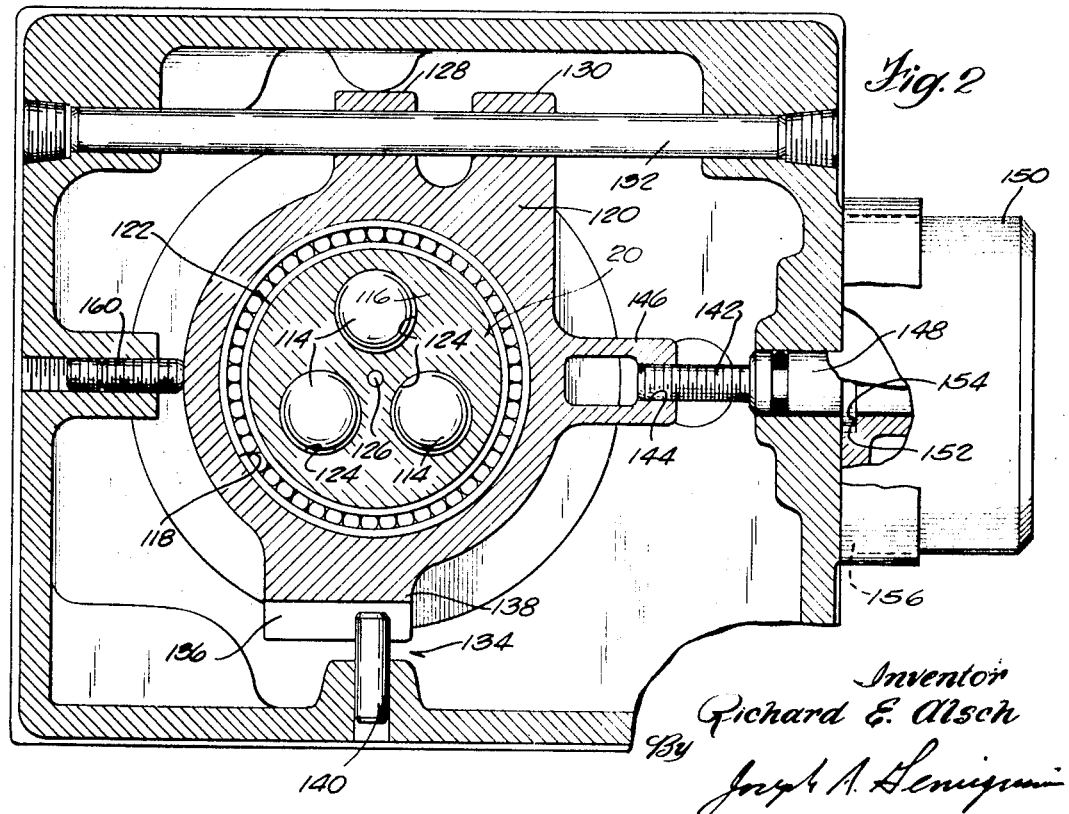
FIG. 2 is a section taken generally along line 2-2 in FIG. 1.

With particular reference to FIG. 2 the adjustment mechanism for varying the position of the ball galaxy relative to input and output discs 14 and 18 will now be described.

The ball galaxy includes three balls 114 supported in disc 116 which is in turn supported in an opening 118 of support bracket 120 by ball bearing 122. Balls 114 are free for rotation within their respective openings 124 and disc 116, with balls 114, is capable of rotation in ball bearing 122, more specifically within bracket 120 about center 126. This is the basic rotational movement of the ball galaxy which is used to transmit rotation.

Bracket 120 includes two projecting ears 128 and 130 which engage elongated rod 132. Rod 132 is supported in the housing wall. Generally diametrically opposite from the engagement between ears 128 and 130 with rod 132, a pin and slot engagement 134 is provided between the housing and bracket 120. Structurally, this engagement comprises a slot 136 in projection 138 of bracket 120 and pin 140 fixed to the housing and engaged in slot 136. This combination of rod 132 engaged in projections 128 and 130 and the pin and slot engagement supports the bracket so that the ball galaxy can be moved linearly between the input and output discs but will be held generally in a given plane parallel to the surfaces 26 and 28 of the disc. Pin 140 does not have a close fit in slot 136 and is free for at least some limited movement in the slot to permit the discs and ball galaxy to align themselves for effective rotation transmission. To produce movement of the ball galaxy a screw 142 is engaged in a threaded opening 144 provided in hub 146 on bracket 120. Screw 142 is part of a shaft 148 which is connected to adjusting knob 150. Shaft 148 includes a flange 152 disposed in slot 154 defined by hub 156 fixed to the housing and end wall 155. In this manner as knob 150 is rotated shaft 148 and screw 142 also rotate but do not move axially by virtue of the engagement of flange 152 in slot 54. However, the action of threads 142 in bore 144 will cause the bracket 120 and the ball galaxy to move either left or right, as viewed in the drawing, depending on the direction of rotation of knob 150, that is left or right across the confronting faces of the input and output discs. As illustrated in FIG. 2, the bracket 120 is at the extreme left end of movement, which is established by stop screw 160.

With this arrangement, the adjustment forces for moving the ball galaxy are applied directly in alignment with axis 126. This provides more effective adjustment while requiring relatively lower adjusting forces. The lower adjusting forces are a result of the adjusting force being applied in alignment with the center of the ball galaxy i.e. axis 126.

One further feature which should be noted is the use of only three balls 114 in the galaxy. By using a fewer number of relatively larger diameter balls, i.e. fewer and larger as compared to the number and size of balls heretofore used in this type of transmission, the interior of the transmission is open to a greater extent for better lubrication. Moreover, using a fewer number of balls facilitates alignment of the confronting faces 14 and 18 as compared to an arrangement wherein a larger number of balls are provided which then must be arranged on a greater radius with respect to the center of rotation for example center 126.

I claim:

1. A variable transmission comprising, in combination, an input member having a generally planar first surface, input shaft means connected to said input member, an output member having a generally planar second surface spaced axially from and in opposed relation to said first surface, output shaft means connected to said output member, a plurality of balls engaged between said first and second planar surfaces for transmitting rotation between said input and output members, and means for applying an axial force urging said input and output members into engagement with said balls to form a rotation transmitting assembly and including first spring means supported on one of said shaft means and disposed on one axial side of said rotation transmitting assembly and reacting against means defining a seat on the opposite axial side thereof to exert an axial force urging said input and output members and balls into engagement, second spring means supported on one of said shaft means and disposed on at least one axial side of said rotation transmitting assembly and reacting against means defining a seat on the opposite axial side thereof to exert an axial force urging said input and output members and balls into engagement, and said second spring means and the means against which it reacts being disposed, relative to said rotation transmitting assembly, axially outboard of said first spring means and the means against which said first spring means reacts and said first spring means having a loose-type fit on the shaft means on which it is disposed so that said first and second spring means share the axial thrust load of said transmission with the axial force of said second spring means bypassing said first spring means.

2. The variable transmission of claim 1 including bearing means disposed on said input and output shaft means, means defining engagement between said bearing means and said shaft means preventing axial movement of said bearing means on said shaft means toward said rotation transmitting assembly, bearing means engaged by each of said spring means and biased thereby axially toward said rotation transmitting assembly so that said axial force urging said input and output members into engagement with said balls is transmitted through said shaft means, and said bearing means engaged with said first spring means having a slip-type fit on said shaft means so that the axial force provided by said second spring means bypasses said first spring means.

3. The variable transmission of claim 1 wherein said first spring means includes springs disposed on both axial sides of said rotation transmitting assembly with the spring on one axial side reacting against the spring on the other axial side.

4. The variable transmission of claim 1 wherein said means for applying said axial force includes a first bearing on said output shaft means disposed on one axial side of said rotation transmitting means, means defining engagement between said first bearing and said input shaft means preventing axial movement of said first bearing on said input shaft means toward said rotation transmitting assembly, a first spring engaging and biasing said first bearing axially toward said rotation transmitting assembly, a second bearing on said output shaft means disposed, relative to said first bearing on an opposite axial side of said rotation transmitting assembly, means defining engagement between said second bearing and said output shaft means preventing axial movement of said second bearing on said output shaft means toward said rotation transmitting assembly, a second spring engaging and biasing said second bearing axially toward said rotation transmitting assembly, means seating said first and second springs relative to said rotation transmitting assembly so that said first and second springs provide an axial force maintaining motion transmitting engagement between said input and output members and said balls, a third bearing on said input shaft means disposed on one axial side of said rotation transmitting assembly, means defining engagement between said third bearing and said input shaft preventing axial movement of said third bearing on said input shaft means toward said rotation transmitting assembly, a third spring engaging and biasing said third bearing axially toward said rotation transmitting assembly, a fourth bearing on said output shaft means disposed, relative to said third bearing, on said opposite axial side of said rotation transmitting assembly, means defining engagement between said fourth bearing and said output shaft means preventing relative axial movement between said fourth bearing, said output shaft means, and said rotation transmitting assembly, said third spring means reacting against said fourth bearing to provide an axial force maintaining motion transmitting engagement between said input and output members and said balls, and said first and second bearings having a slip-type fit on said input and output shaft means so that said spring means share the axial thrust load of said transmission with the axial force of said third spring bypassing said first and second springs and first and second bearings.

5. The variable transmission of claim 4 wherein said input and output members comprise discs, said input and output shaft means are connected, respectively, to said input and output discs, and said means preventing axial movement of said bearings toward said rotation transmitting assembly comprise shoulders on said input and output shaft means facing axially away from said rotation transmitting assembly and said bearings engaging said shoulders.

6. The variable transmission of claim 4 including a housing wherein said spring means comprise Belleville-type springs and said bearings are ball bearings, and wherein said Belleville springs are engaged between said housing and said ball bearings and engagement with said ball bearings is made through the outer race thereof.

7. The variable transmission of claim 1 including means supporting said balls between said input and output members and defining with said balls a galaxy assembly wherein said balls are supported for independent rotation about their own respective axis and for joint rotation about a common axis, and means supporting said galaxy assembly for adjustable movement on the opposed surfaces of said input and output members and comprising means engaging said galaxy assembly on generally diametrically opposite sides of said galaxy assembly and supporting said galaxy assembly for linear movement on said opposed surfaces, and adjusting means engaging said galaxy assembly in alignment with said common axis for applying an adjusting force in alignment with said common axis for moving said galaxy on said opposed surfaces.

8. A variable transmission comprising, in combination, an input member having a generally planar first surface, input shaft means connected to said input member, an output member having a generally planar second surface spaced axially from and in opposed relation with said first surface, output shaft means connected to said output member, a plurality of balls engaged between said first and second planar surfaces for transmitting rotation between said input and output members, means supporting said balls between said input and output members and defining with said balls a galaxy assembly wherein said balls are supported for independent rotation about their own respective axis and joint rotation about a common axis, and means supporting said galaxy assembly for adjustable movement on the opposed surfaces of said input and output members and comprising means engaging said galaxy assembly on generally diametrically opposite sides of said galaxy assembly and supporting said galaxy assembly for linear movement on said opposed surfaces, and adjusting means engaging said galaxy assembly in alignment with said common axis for applying an adjusting force in alignment with said common axis for moving said galaxy assembly on said opposed surfaces.